United States Patent
Dunn et al.

(10) Patent No.: US 6,169,805 B1
(45) Date of Patent: Jan. 2, 2001

(54) SYSTEM AND METHOD OF OPERATION FOR PROVIDING USER'S SECURITY ON-DEMAND OVER INSECURE NETWORKS

(75) Inventors: James M. Dunn, Ocean Ridge, FL (US); Alan G. Ganek, Chappaqua, NY (US); Edith H. Stern, Boca Raton, FL (US); Barry E. Willner, Briarcliff Manor, NY (US)

(73) Assignee: International Business Machines Corporation, Armonk, NY (US)

(*) Notice: Under 35 U.S.C. 154(b), the term of this patent shall be extended for 0 days.

(21) Appl. No.: 08/808,895

(22) Filed: Feb. 28, 1997

(51) Int. Cl.[7] .................................................. H04L 9/00
(52) U.S. Cl. ........................ 380/277; 380/278; 380/259; 380/260; 380/284; 380/285; 380/30; 705/51; 705/57; 713/165; 713/162; 713/200
(58) Field of Search ................... 380/49, 3, 4, 28, 380/29, 21, 259, 260, 277, 278, 283, 285, 30; 705/51, 57; 713/164, 165, 162, 201

(56) References Cited

U.S. PATENT DOCUMENTS

| | | | |
|---|---|---|---|
| 3,962,539 | * 6/1976 | Ehrsam et al. | 178/22 |
| 4,484,025 | * 11/1984 | Ostermann et al. | 178/22.09 |
| 5,548,646 | 8/1996 | Aziz et al. | 380/23 |
| 5,550,984 | 8/1996 | Gelb | 395/200 |
| 5,757,911 | * 5/1998 | Shibata | 380/18 |

FOREIGN PATENT DOCUMENTS

| | | | |
|---|---|---|---|
| 693836 A1 | 1/1996 | (EP) | H04L 9/30 |
| PCT/US85/ 00132 | * 8/1985 | (WO) | H04N 7/16 |

OTHER PUBLICATIONS

Menezes et al., Handbook of Applied Cryptography, CRC Press, p. 16, 1997.*
TommySoftware, Cloaking Device, Edition 1.10e, http://www.tommysoftware.com, 1996.*
Schneier, Applied Cryptography, John Wiley & Sons, Inc., 2nd edition, pp. 28–29, Oct. 1995.*

* cited by examiner

Primary Examiner—Tod R. Swann
Assistant Examiner—Paul E Callahan
(74) Attorney, Agent, or Firm—Morgan & Finnegan, LLP; Joseph C. Redmond, Jr.

(57) ABSTRACT

Secure communication may be conducted between two or more parties over a network, e.g the Internet without prior security arrangements among the parties or agreed to encryption/decryption software. A sending party is connected to a data network through a computer and has access to a communications network, e.g. a public switched telephone network. The sender prepares a file designated, e.g. "X" containing confidential information for secure transmission over the Internet or the like to one or more receivers. In one embodiment, the sender downloads encryption/decryption or "crypto" software stored at a location on the Internet e.g. location "U" in a Uniform Resource Locator (URL). The "crypto" software is written in executable code or an interpretive language such as JAVA. The sender selects a key "K" and encrypts the plain text file "X" into cipher text. At some point the communication network is accessed and the receiver(s) is notified of the URL U where the "crypto" software is located and the key "K" for decrypting the file "X". Afterwards, the receiver(s) accesses the URL U using his computer and a web browser. The crypto software is pointed to in Hyper Text Mark Up Language (HTML) and displayed on the receiver screen(s). The HTML page requests the "Key" which the receiver enters. The file "X" is downloaded and decrypted using the key "K" and displayed at the receiver screen(s).

18 Claims, 2 Drawing Sheets

SYSTEM AND METHOD OF OPERATION FOR PROVIDING USER'S SECURITY ON-DEMAND OVER INSECURE NETWORKS

BACKGROUND OF THE INVENTION

1. Field of the Invention

This invention relates to communication networks. More particularly, the invention relates to systems and methods for providing users security on-demand over unsecure networks.

2. Background Discussion

One of the greatest problems in data networking and data internetworking is the need to ensure security on-demand for communications between entities or parties that have not previously agreed to a given security scheme. At least two types of networks are available for the transmission of confidential information between entities or parties. The Public Switch Telephone Network (PSTN) is generally accepted as suitable for communicating a large percentage of commercially confidential information. Confidential information may be exchanged between parties in person-to-person calls or on conference calls. For highly confidential information, voice encryption mechanisms are available which require special hardware. However, such mechanisms are not generally employed in the normal course of business between parties.

Data networks, including the Internet, are less secure than the PSTN due to the ability of the data to be intercepted by third parties. Security schemes do exist that provide encryption for confidential information on data networks. When encryption is implemented, the parties, in advance of communication, must agree to an encryption algorithm or the parties enroll in a service provided by a trusted third party.

Prior art related to secure communications over a data network include the following:

U.S. Pat. No. 5,550,984 by E. J. Gelb, issued Aug. 27, 1996, discloses a system for preventing unauthorized communications between two computer networks. Each network includes a motherboard having a network interface adapter for communication with the network. Each motherboard has a transfer adapter for the other motherboard which is identical and matched. Each motherboard has network operating software to prevent transmission of routing services information between the network interface adapter of each motherboard. Protocol conversion software in each motherboard prevents upper level layer protocol information and originating source and destination address information from being passed between the network interface adapter and the transfer adapter of each motherboard.

U.S. Pat. No. 5,548,646 of Aziz et al., issued Aug. 20, 1996, discloses a system of secure transmission of data packets which automatically encrypt and decrypt between sites on the Internet or other computer networks. Messages or packets requiring security are automatically encrypted without any separate action on the part of the user so that no one on a public network can determine the contents of the message or the packets.

European Patent 693,836-A1 to Ashar Aziz issued Jan. 24, 1996, discloses a key management procedure for Internet protocols in connecting data processing devices via private networks to the Internet. Each data processing device connected to the Internet at a node includes a secure value for allowing access to the other node.

None of the prior art allows parties with no prior agreement, and without the intervention of a third party service to exchange information at the security level of the PSTN. Accordingly, a need exists to provide voice and data conferencing over the PSTN and Internet at a security level of the PSTN without prior security arrangements among the parties exchanging the confidential information.

SUMMARY OF THE INVENTION

An object of the invention is a communications network and method of operation which provides security on-demand between parties exchanging confidential information without prior arrangements.

Another object is a communications network and method of operation using interpretive encryption/decryption software stored in a network and accessed "on-demand" by the parties for exchanging confidential information.

Another object is a system and a method of operation which uses two communication channels for exchanging confidential information, one channel providing an encryption/decryption software and the other channel transmitting a security key for the encryption/decryption software.

Another object is a system and method for exchanging confidential information in a data network, on-demand, without prior security arrangements where the confidential information may be exchanged synchronously, near-synchronously or store and forward.

These and other objects, features and advantages are achieved in a communication network without built-in security in which a sending party is connected to the network through a computer. The sender prepares a file, for example designated "X", containing confidential information for secure transmission over the network to one or more receivers. In one embodiment, the sender downloads encryption/decryption or "crypto" software stored at a location on data network, e.g. the Internet at a location "U" in a Uniform Resource Locator (URL). Alternatively, the Internet-stored "crypto" software may be resident at the sending machine. Preferably, the "crypto" software is written in an interpretive language in which the "crypto" software is interpreted directly by a software interpreter which runs on a receiver machine. The sender selects a key "K" and encrypts the plain text file "X" into cipher text using the "crypto" software. Before or after transmitting the cipher text to the receiver(s), the sender notifies the receiver(s) over a communication network e.g. a PSTN of the URL U where the "crypto" software is located and the key "K" for decrypting the file "X" using the "crypto" software. After the telephone call, the receiver accesses URL location "U" on the Internet using his computer and a standard web browser. The URL location "U" points to the Hyper Text Mark-Up (HTML) text which is displayed on the receiver's screen. The "crypto" software is downloaded to the receiver terminal equipment. The HTML page requests the key "K" which the receiver enters and the file "X" is downloaded, decrypted and displayed at the receiver's screen using the key "K".

DESCRIPTION OF DRAWING

The invention will be further understood from the following Description of Preferred Embodiment taken in conjunction with the appended drawing, in which.

DESCRIPTION OF PREFERRED EMBODIMENT

Figure 1:
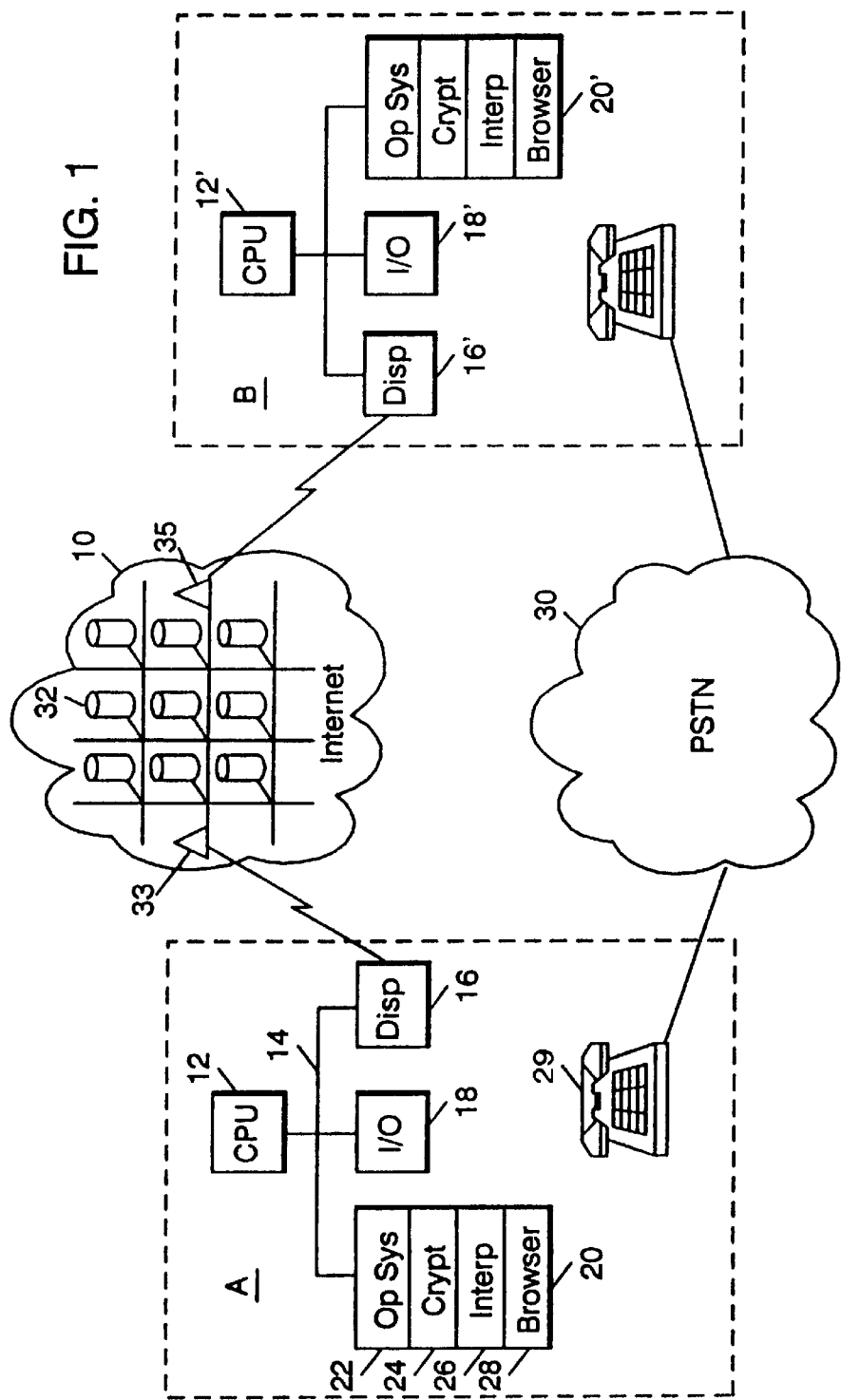
FIG. 1 is a representation of a communication network having security on-demand for transmitting confidential information between parties without prior security arrangements according to the principles of the present invention.

In FIG. 1, a party "A" or sender desires to securely transmit confidential information over an unsecured data communication network 10, such as the Internet, to a party "B" or receiver without prior security arrangements or the assistance of a trusted third party. The sending and receiving stations "A" and "B" are similarly equipped. Each station includes a CPU 12 for preparing and downloading data files to the network 10. The CPU is coupled through a data bus 14 to a modem 16 for transmitting and receiving data to/from the network 10. An I/O device 18 including a display, keyboard or pointing device (all not shown) facilitate the preparation and downloading of confidential information to the network 10. A memory 20 includes stored program instructions or software to implement the secure transmission/reception of confidential information between the parties "A" and "B" through the unsecured data network 10. Among the stored program instructions is included a Standard Operating System (SOP) 22 for controlling the operation of the CPU 12. Encryption/decryption software 24 is stored in the memory 20 or downloaded from the network. The "crypto" software converts plain text prepared by a sender into cipher text or alternatively, cipher text into plain text using a security key to be discussed hereinafter. The "crypto" software is written in an interpretive or script language such as, JAVA[1], or any other downloadable, executable software, such as a "plug-in" or program. In one embodiment, the software 24 is downloaded from the network 10 prior to the desired transmission or receipt of the confidential information. Alternatively, the software 24 can be a stand-alone module, which can be loaded either as an extension of the operating system; an extension of the communication system; or an extension of an application. For simplicity in description, the "crypto" software shall be described as a stand-alone module. For systems where this is not appropriate, it may be bundled with a downloadable application.

Also stored in the memory 20 is an interpreter 26 for use with the software 24 and a web browser 28, such as Netscape Navigator™, for accessing the network 10.

Completing the equipment at station "A" is a communication device 29 which may be a telephone or other voice-type device for communicating with a receiver at station "B" through a public switch telephone network 30.

The Internet 10 is a distributed information system which stores data on many interconnected computers including storage mediums 32 instead of storing data at a single location. Client servers 33 and 35 couple Stations "A" and "B", respectively to the network 10. The client servers provide pointers or links to the data stored in databases 32 spread out over the entire Internet. The Internet is filled with Uniform Resource Locators (URLs) which collect together all known documents on a topic from the databases. The data stored in the databases 32 is typically in Hyper-Text Mark-Up (HTML) form which is a means of automatically linking documents from different database sources in the Internet to the document selected.

A web browser 28 such as Netscape Navigator™ or the like is used by the sender or user to create a unique hyper-text based menu on the display screen at the station. As a user chooses from the menu, an item or resource or moves from one document to another on the menu, the station may be jumping between computers on the Internet while the browser handles all the connections. A more detailed description of the operation of the Internet appears in the text "How The Internet Works" by Joshua Eddings, Ziff-Davis Press, Emeryville, Calif. 94608 (ISBN 1-56276-192-7).

Figure 2:
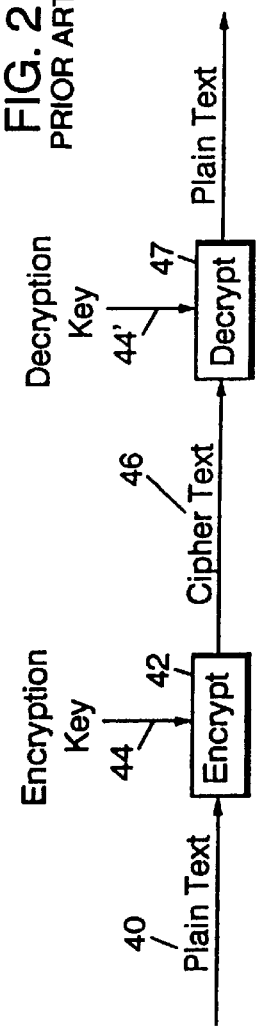
FIG. 2 is a block diagram of a prior art encryption/decryption method.

In FIG. 2, the process of cryptography will be briefly described. A plain text message 40 is subject to encryption using a cryptographic algorithm 42. The encryption algorithm 42 may be published and well-known such as the Data Encryption Standard (DES), but is made secret by the use of the key 44. Keys are random bit strings generated by an automatic random number process. ANSI X9.17 Standard specifies a method of key generation. Both the encryption and decryption operation use the key encryption/decryption algorithm and execute the following equation:

Encryption Equation 1: $E_K(M)=C$

Decryption Equation 2: $D_K(C)=M$ where:
$E_K$=Encryption Key
M=Message
C=Cipher Text
$D_K$=Decryption Key
Such that $D_K(E_K)(M)=M$ Further details on the encryption/decryption process can be obtained from the text "Applied Cryptography", 2nd Edition, by B. Schneider, published by John Wiley & Sons, New York City, N.Y., 1996 (ISBN 0-471-12845-7 or 0-471-11709-9).

Thus, the plain text 40 is encrypted in a standard encryption algorithm, e.g., DES, using the key 44 such that the cipher text 46 appearing at the output of the encryption 42 is decrypted in a decrypter 47 using the same algorithm and key and restoring the plain text in accordance with Equations 1 and 2 cited above.

The process of the invention involves the use of two communication channels: (1) A distributed information system or Internet for transmitting an encrypted message to a receiver and (2) A communication network, e.g, Public Switch Telephone Network (PSTN) for verbally transmitting the key to the receiver. The use of two communication channels increases the level of security for the confidential communication. The two communication channels can protect the information even if one of the channels has been compromised, such as the Internet packets being examined.

Figure 3:
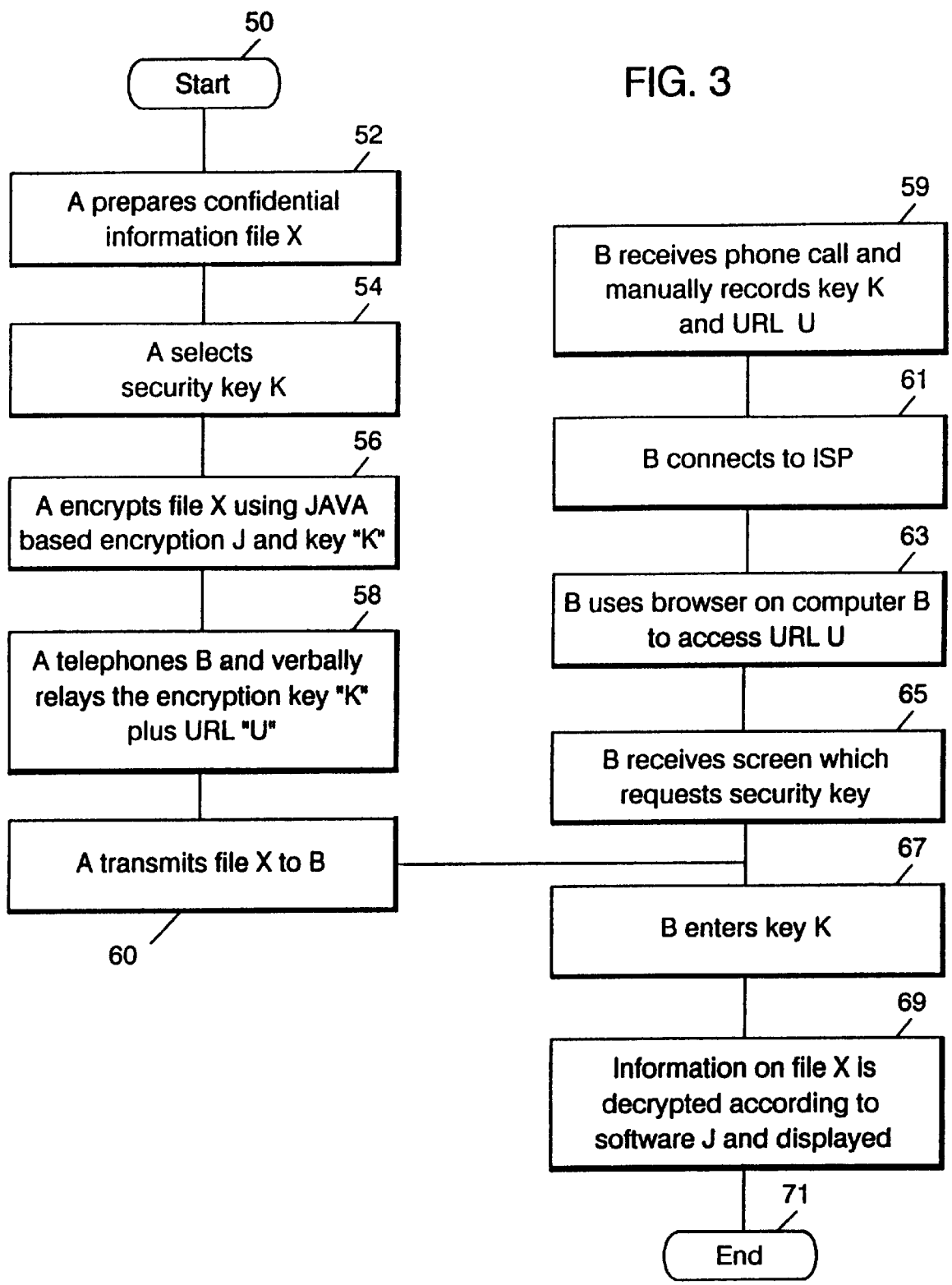
FIG. 3 is a flow diagram for securely transmitting confidential information between at least one sender and one receiver using the network of FIG. 1.

The process of the invention will be described in conjunction with FIG. 3. The sending process is entered in a Start step 50 in which the sender "A" prepares a confidential information file or "X" file in an operation 52. Using the process of FIG. 2, "A" selects a security key "K" in an operation 54. "A" encrypts the file "X" using an interpretive language such as, JAVA, based encryption "J" and key "K", in an operation 56. Prior to transmitting the encrypted confidential message "X" to "B", a telephone call is placed in which "B" is verbally informed by "A" of the encryption "K" plus the directory location in the Internet for the location of the cryptographic software in an operation 58. The directory location is associated with the encryption/decryption software "J" for acquisition and the exercise by the receiver "B". In an operation 60, "A" transmits the encrypted file "X" to party "B". The transmission of the key, the encryption/decryption software, and the encrypted file "X" containing the confidential information may be in any order with the understanding that the encryption software, the encryption key and the encrypted file "X" must come together usually before the transmission of the file to party "B". However, the file can be received, after which the key can be received for decryption.

Party "B" responds to the step 58 by manually recording the key "K" and the directory location "U" in an operation 59. After which, "B" in an operation 61 connects his computer to the Internet 10 through the client server following standard Internet protocols.

In an operation 63, "B" uses the browser 28 to access the directory location "U" containing the encryption/decryption software. In an operation 65, the server 35 for station "B" displays an HTML page pointed to by the directory location. The HTML page requests an encryption key, whereupon in an operation 67, "B" enters the encryption key which was received via the telephone audio connection in step 58. Using the key "K", in an operation 69, "B" decrypts the file "X" at the station using the interpretive software specified by "A". The clear text displayed at the station may be stored or printed out according to the desires of party "B." The transfer of confidential information is completed and the process ends in step 71.

In applications involving secure multi-party conferencing, there may be requirements for encrypting different information. This may occur, for example, when different parties are supplying different portions of the data conference. Further, some of the information may not be encrypted at all. To distinguish between encrypted and decrypted information, a tag may be attached to the information to indicate which key is applicable to which information.

Summarizing, the ubiquitous availability of Internet compliant client code which includes the ability to interpret an interpretive language, allows end users to participate in this security method without any software preload. Freedom from configuration management, software preloads, and the requirements to match both ends with the same shrink wrap software significantly enhances the usefulness of this security system and method.

While the present invention has been described in conjunction with a preferred embodiment, various modifications may be made in form without departing from the spirit and scope of the present invention as defined in the appended claims in which:

We claim:

1. A system for secure communication over a network without security over an insecure network and without prior security arrangements among a sender and at least one receiver, comprising:

a) a sender station coupled to the insecure network through a first data terminal equipment;

b) at least one receiver station coupled to the insecure network through a second data terminal equipment;

c) a communication path in the insecure network linking the sender and the at least one receiver station;

d) means for encrypting text in a file "X" using crypto software stored in the insecure network at an unidentified URL location to the at least one receiver station without the intervention of a third party prior to transmitting the encrypted file "X" to the at least one receiver station by the sender station over the insecure network using the communication path; the text being encrypted using a key "K";

e) means for communicating over a network other than the insecure network to the at least one receiver station the key "K" and an identified URL location of the crypto software stored in the insecure network;

f) transmitting the encrypted file "X" to the at least one receiver station over the insecure network;

g) means for accessing the crypto software at the identified location in the insecure network by the at least one receiver station; and h) means for decrypting at the least one receiver station the file "X" into clear text using the crypto software and the key "K" provided by the sender station over the network other than the insecure network whereby secure communication is conducted between the sender and the at least one receiver stations without intervention of third parties and security arrangement preceding the communication.

2. The system of claim 1 wherein the unsecure network is a distributed information system and is coupled through servers to the sending and receiving station.

3. The system of claim 2 further including a browser for searching the unsecure network.

4. The system of claim 1 further including an interpretive or executable based software for encrypting/decrypting the text.

5. The system of claim 1 further including a publicly available crypto algorithm and a private key for encrypting/decrypting the text.

6. The system of claim 1 wherein the network other than the unsecure network is a public switched network.

7. The system of claim 1 wherein the crypto software is stored in the first data terminal equipment or at a location in the unsecure network available on demand to the sender and receiver stations.

8. The system of claim 7 wherein the publicly available crypto software is the Data Encryption Standard (DES).

9. The system of claim 7 wherein the distributed information system is the Internet and the crypto software is stored at a location in a Uniform Resource Locator (URL).

10. The system of claim 9 wherein the sender provides the at least one receiver with the key "K" and identifies the location of the crypto software in the URL prior to transmitting the encrypted text.

11. In a communication system including a sender station; at least one receiver station, both sending and receiving stations coupled to a network and having access to a separate communication path, a method for secure communication over the network without prior security arrangements among the sender and at least one receiver station comprising the steps of:

a) encrypting text in a file "X" for transmission to the at least one receiver station by the sender station over the network; the text being encrypted using a key "K" and crypto software written in executable code and stored in the network at a location unknown to the at least one receiver;

b) communicating over the separate communication path to the at least one receiver the key "K" and an identified location of the crypto software stored in the network by the sender without the intervention of a third party prior to the transmission of the encrypted file "X" to the at least one receiver station over the network;

c) accessing the crypto software at the identified location in the network specified over the communicating means by the sender to the at least one receiver station; and d) decrypting in the network the file "X" into clear text using the crypto software at the identified location and the key "K" communicated to the at least one receiver station by the sender whereby secure communication is conducted between the sender and the at least one receiver station without intervention of third parties and security arrangements preceding the communication.

12. The method of claim 11 further including the step of storing the crypto software at a location in the network; the crypto software being available on demand to the sender and receiver stations.

13. The method of claim 12 further including the step of using a publicly available algorithm to encrypt/decrypt the file "X" using the key "K".

14. The method of claim 13 wherein the network is the Internet and the separate communication path is a public switched telephone network.

15. An article of manufacture, comprising:
a computer usable medium having computer readable program code means embodied therein executable in a computer system for secure communication over a network without prior security arrangements among a sender and at least one receiver station, the computer readable program code means in said article of manufacture comprising:
  a) computer readable program code means for encrypting text in a file "X" for transmission to the at least one receiver station by the sender station over the network; the text being encrypted using a key "K" and crypto software written in an executable code identified as JAVA and stored in the network at a location unknown to the at least one receiver;
  b) computer readable program code means for communicating over the separate communication path to the at least one receiver the key "K" and an identified location of the crypto software stored in the network by the sender without the intervention of a third party prior to the transmission of the encrypted file "X" to the at least one receiver station over the network;
  c) computer readable code means for accessing the crypto software at the identified location in the network specified over the communicating means by the sender to the at least one receiver station; and
  d) computer readable code means for decrypting in the network the file "X" into clear text using the crypto software and the key "K" communicated to the at least one receiver station by the sender whereby secure communication is conducted between the sender and the at least one receiver stations without intervention of third parties and security arrangement preceding the communication.

16. A system for secure communication over an insecure network among a sender and at least one receiver without prior security arrangements, comprising:
  a) means coupling the sender the insecure network
  b) means coupling at least one receiver to the insecure network;
  c) means for receiving and storing crypto software in the insecure network from the sender at a location unknown to the at least one receiver in the insecure network;
  d) means for encrypting information in a file by the sender using the crypto software stored in the insecure network at the location unknown to the at least one receiver prior to transmitting the encrypted information file to the at least one receiver station over the insecure network; the information being encrypted using a key "K";
  e) means for communicating over a network other than the insecure network to the at least one receiver station the key "K" and an identified location of the crypto software stored in the insecure network;
  f) transmitting the encrypted information file to the at least one receiver over the insecure network;
  g) means for accessing the crypto software at the identified location in the insecure network by the at least one receiver; and
  h) means for decrypting the encrypted information file by the at least one receiver using the crypto software stored at the identified location in the network and the key "K" provided by the sender over the network other than the insecure network whereby secure communication is conducted between the sender and the at least one receiver, without intervention of third parties and security arrangements preceding the communication.

17. In a communication system including a sender; at least one receiver, both sender and receiver coupled to an insecure network, a method for secure communication over the insecure network without prior security arrangements among the sender and at least one receiver comprising the steps of:
  a) encrypting information in a file for transmission to the at least one receiver by the sender over the insecure network; the information being encrypted using a key "K" and crypto software written in executable code;
  b) storing the crypto software by the sender at a location unknown to the at least one receiver in the insecure network;
  c) communicating to the at least one receiver by the sender over a network other than the insecure network the key "K" and an identified location of the crypto software in the insecure network;
  d) accessing the crypto software at the identified location in the insecure network by the at least one receiver; and
  e) decrypting the encrypted information file using the crypto software and the key "K" by the at least one receiver station whereby secure communication is conducted between the sender and the at least one receiver without intervention of third parties and security arrangements preceding the communication.

18. An article of manufacture, comprising:
a computer usable medium having computer readable program code means embodied therein executable in a computer system for secure communication over an insecure network without prior security arrangements among a sender and at least one receiver, the computer readable program code means in said article of manufacture comprising:
  a) computer readable program code means for encrypting information in a file for transmission to the at least one receiver by the sender over the insecure network; the encrypted information file being encrypted using a key "K" and crypto software written in an executable code stored at a location unknown to the at least one receiver in the insecure network by the sender;
  b) computer readable program code means for communicating to the at least one receiver by the sender over a network other than the insecure network the key "K" and an identified location of the crypto software in the insecure network;
  c) computer readable code means for accessing the crypto software at the identified location in the network by the at least one receiver; and
  d) computer readable code means for decrypting in the insecure network the encrypted information file by the at least one receiver using the crypto software and the key "K" provided by the sender over the network other than the secure network whereby secure communication is conducted between the sender and the at least one receiver stations without intervention of third parties and prior security arrangement between the sender and the receiver.

* * * * *